(12) United States Patent
Mihm et al.

(10) Patent No.: US 11,148,570 B2
(45) Date of Patent: Oct. 19, 2021

(54) ACTUATING REAR CENTER HEAD RESTRAINT

(71) Applicant: GM Global Technology Operations LLC, Detroit, MI (US)

(72) Inventors: Russell J. Mihm, Beverly Hills, MI (US); Venkata Narasimha R. Cherukuvada, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/696,037

(22) Filed: Nov. 26, 2019

(65) Prior Publication Data
US 2021/0155135 A1 May 27, 2021

(51) Int. Cl.
*B60N 2/888* (2018.01)
*B60N 2/427* (2006.01)
*B60N 2/876* (2018.01)

(52) U.S. Cl.
CPC .......... *B60N 2/888* (2018.02); *B60N 2/4279* (2013.01); *B60N 2/876* (2018.02)

(58) Field of Classification Search
CPC ....... B60N 2/4279; B60N 2/876; B60N 2/888
See application file for complete search history.

(56) References Cited

U.S. PATENT DOCUMENTS

| | | | | | |
|---|---|---|---|---|---|
| 3,065,029 | A | * | 11/1962 | Spound | A47C 7/38 297/391 |
| 3,454,303 | A | * | 7/1969 | Dangauthier | B60N 2/832 297/396 |
| 4,623,166 | A | * | 11/1986 | Andres | B60N 2/874 280/751 |
| 4,711,494 | A | * | 12/1987 | Duvenkamp | B60N 2/874 297/403 |
| 4,796,953 | A | * | 1/1989 | Pereira | B60N 2/847 297/400 |
| 5,095,257 | A | * | 3/1992 | Ikeda | B60N 2/002 318/568.1 |
| 5,145,233 | A | * | 9/1992 | Nagashima | B60N 2/874 297/408 |
| 5,669,668 | A | * | 9/1997 | Leuchtmann | B60N 2/859 297/408 |
| 5,681,079 | A | * | 10/1997 | Robinson | B60N 2/3013 297/61 |
| 5,700,054 | A | * | 12/1997 | Lang | B60N 2/3084 297/238 |
| 5,738,411 | A | * | 4/1998 | Sutton | B60N 2/3013 297/378.12 |

(Continued)

*Primary Examiner* — James M Ference (57) ABSTRACT

A rear-center head restraint system of an automobile vehicle includes a rear seatback of the automobile vehicle. A head restraint assembly is rotatably mounted to the rear seatback and is moved between a stowed position and an in-use position. The head restraint assembly includes a rear head restraint body defining an L-shape and includes a forward-facing surface moved toward a head of an occupant at the in-use position. At least a first link and a second link are rotatably connected to the seatback. The first link and the second link are also rotatably connected to the rear head restraint body. A release system rotates the head restraint assembly selectively between the stowed position and the in-use position.

7 Claims, 7 Drawing Sheets

(56) References Cited

U.S. PATENT DOCUMENTS

| | | | | |
|---|---|---|---|---|
| 5,826,942 A * | 10/1998 | Sutton | B60N 2/305 | 297/378.12 |
| 6,050,633 A * | 4/2000 | Droual | B60N 2/874 | 297/61 |
| 6,074,010 A * | 6/2000 | Takeda | B60N 2/856 | 297/391 |
| 6,074,011 A * | 6/2000 | Ptak | B60N 2/874 | 297/408 |
| 6,113,192 A * | 9/2000 | Schneider | B60N 2/874 | 297/403 |
| 6,129,421 A * | 10/2000 | Gilson | B60N 2/85 | 297/408 |
| 6,508,512 B2 * | 1/2003 | Saberan | B60N 2/818 | 297/408 |
| 6,860,564 B2 * | 3/2005 | Reed | B60N 2/20 | 297/408 |
| 7,234,778 B1 * | 6/2007 | Toba | B60N 2/859 | 297/403 |
| 7,258,400 B2 * | 8/2007 | Yamada | B60N 2/22 | 297/378.12 |
| 7,431,399 B2 * | 10/2008 | Kern | B60N 2/821 | 297/403 |
| 8,128,162 B2 * | 3/2012 | Gerhardt | B60N 2/818 | 297/61 |
| 8,152,242 B2 * | 4/2012 | Yetukuri | B60N 2/859 | 297/408 |
| 8,197,007 B2 * | 6/2012 | Lutzka | B60N 2/844 | 297/408 |
| 8,616,625 B2 * | 12/2013 | Buccinna | B60N 2/3011 | 297/61 |
| 8,616,650 B2 * | 12/2013 | Markel | B60N 2/859 | 297/408 |
| 9,758,075 B2 * | 9/2017 | Andersson | B60N 3/102 | |
| 2002/0084686 A1 * | 7/2002 | Takata | B60N 2/856 | 297/408 |
| 2003/0098596 A1 * | 5/2003 | Andreasson | B60N 2/859 | 297/61 |
| 2004/0227386 A1 * | 11/2004 | Tsujibayashi | B60N 2/01583 | 297/344.1 |
| 2005/0057081 A1 * | 3/2005 | Kahn | B60N 2/3013 | 297/331 |
| 2005/0264078 A1 * | 12/2005 | Saberan | B60N 2/874 | 297/408 |
| 2006/0220433 A1 * | 10/2006 | Yetukuri | B60N 2/859 | 297/408 |
| 2007/0001500 A1 * | 1/2007 | Kraft | B60N 2/859 | 297/408 |
| 2007/0085400 A1 * | 4/2007 | Terada | B60N 2/4228 | 297/391 |
| 2007/0114810 A1 * | 5/2007 | Yetukuri | B60N 2/0224 | 296/65.01 |
| 2007/0114822 A1 * | 5/2007 | Yetukuri | B60N 2/0244 | 297/217.3 |
| 2008/0093910 A1 * | 4/2008 | Kato | B60N 2/3013 | 297/463.2 |
| 2010/0001561 A1 * | 1/2010 | Otsuka | B60N 2/865 | 297/216.12 |
| 2010/0133889 A1 * | 6/2010 | Lutzka | B60N 2/844 | 297/408 |
| 2010/0219670 A1 * | 9/2010 | Jammalamadaka | B60N 2/859 | 297/408 |
| 2010/0320824 A1 * | 12/2010 | Aoki | B60N 2/36 | 297/378.1 |
| 2012/0001461 A1 * | 1/2012 | Alexander | B60N 2/876 | 297/216.12 |
| 2012/0098311 A1 * | 4/2012 | Kobayashi | B60N 2/3013 | 297/331 |
| 2012/0212025 A1 * | 8/2012 | Schroeder | B60N 2/874 | 297/391 |
| 2012/0235459 A1 * | 9/2012 | Yetukuri | B60R 21/01532 | 297/391 |
| 2012/0261967 A1 * | 10/2012 | Ahlbrand | B60N 2/809 | 297/391 |
| 2012/0326481 A1 * | 12/2012 | Yetukuri | B60N 2/856 | 297/403 |
| 2013/0049429 A1 * | 2/2013 | Yetukuri | B60N 2/806 | 297/408 |
| 2013/0093218 A1 * | 4/2013 | Yetukuri | B60N 2/859 | 297/61 |
| 2013/0334860 A1 * | 12/2013 | Adams | B60N 2/859 | 297/408 |
| 2014/0015296 A1 * | 1/2014 | Ogata | B60N 2/366 | 297/340 |
| 2014/0054944 A1 * | 2/2014 | Locke | B60N 2/853 | 297/354.13 |
| 2014/0333098 A1 * | 11/2014 | DeForest | B60N 2/206 | 297/61 |
| 2016/0059754 A1 * | 3/2016 | Tabata | B60N 2/58 | 297/391 |
| 2018/0065522 A1 * | 3/2018 | Muldowney | B60N 2/856 | |

\* cited by examiner

ACTUATING REAR CENTER HEAD RESTRAINT

INTRODUCTION

The present disclosure relates to automobile vehicle seat mounted head restraints.

Automobile vehicles provide seat head restraints to reduce or mitigate against whiplash injury during vehicle accidents. Automobile vehicles may include rear passenger seating accommodating three passengers. The rear seat passengers are individually provided with a head restraint which is supported on the seatback of the rear seats. Although outboard head restraints are commonly height adjustable, rear center head restraints are commonly not height adjustable which may position the rear center seat head restraint directly in a vision path of the vehicle operator when using a rearview mirror to view objects behind the automobile vehicle and when the vehicle is backing up. Rear seat head restraints are also commonly difficult to accommodate in vehicles which allow rear seat fold-down, as the head restraints during this operation may contact the front vehicle seats and thereby interfere with rear seat fold-down operation. Rear seat head restraints are therefore commonly removable for this operation however this requires both a temporary stowage position for the removed head restraint as well as a subsequent requirement for the head restraint to be reconnected when the rear seat is returned to its upright position.

Thus, while current vehicle head restraints achieve their intended purpose, there is a need for a new and improved system and method for mounting and operating head restraints used in a rear vehicle seat center position.

SUMMARY

According to several aspects, a rear-center head restraint system of an automobile vehicle includes a rear seatback of the automobile vehicle. A head restraint assembly is rotatably mounted to the rear seatback and is moved between a stowed position and an in-use position. The head restraint assembly includes: a rear head restraint body defining an L-shape or similar shape; and at least one link rotatably connecting the rear head restraint to the rear seatback. A release system rotates the head restraint assembly between the stowed position and the in-use position.

In another aspect of the present disclosure, the at least one link defines a first link rotatably connected to the seatback and a second link rotatably connected to the seatback. The first link and the second link are also rotatably connected to the rear head restraint body.

In another aspect of the present disclosure, a stop member is included wherein contact between the at least one link and the stop member retains the head restraint assembly at the stowed position.

In another aspect of the present disclosure, the release system includes a biasing member biasing the at least one link, wherein rotation of the rear head restraint body about a first arc of rotation compresses the biasing member.

In another aspect of the present disclosure, the release system includes a release device, compression of the biasing member latching the release device at a furthest point of travel along the arc of rotation.

In another aspect of the present disclosure, when the release device is manually triggered the head restraint assembly is biased by a biasing force of the biasing member to rotate about a second arc of rotation opposite to the first arc of rotation and toward the in-use position.

In another aspect of the present disclosure, the release system includes: a gear connected to the first link; and an electric motor operated to rotate the gear and thereby to rotate the rear head restraint body.

In another aspect of the present disclosure, the release system includes a switch actuated to energize the electric motor to one of rotate the rear head restraint body toward the in-use position or the stowed position.

In another aspect of the present disclosure, the release system includes: a threaded gear shaft threadably engaged with an internally threaded member, the internally threaded member fixed against axial rotation; and a connecting link rotatably pinned to the second link.

In another aspect of the present disclosure, the release system includes an electric motor operated to rotate the threaded gear shaft and thereby to rotate the rear head restraint body.

According to several aspects, a rear-center head restraint system of an automobile vehicle includes a rear seatback of the automobile vehicle. A head restraint assembly is rotatably mounted to the rear seatback and is moved between a stowed position and an in-use position. The head restraint assembly includes a rear head restraint body defining an L-shape or similar shape and includes a forward-facing surface moved toward a head of an occupant at the in-use position. A first link is rotatably connected to the seatback and a second link is rotatably connected to the seatback. The first link and the second link are also rotatably connected to the rear head restraint body. A release system rotates the head restraint assembly selectively between the stowed position and the in-use position.

In another aspect of the present disclosure, the release system includes a biasing member biasing the head restraint body toward the in-use position.

In another aspect of the present disclosure, the biasing member defines a coil spring connected to the first link.

In another aspect of the present disclosure, the release system includes an electric motor operated to selectively move the head restraint body to the stowed position or the in-use position.

In another aspect of the present disclosure, the release system includes a gear connecting the electric motor to one of the first link or the second link.

In another aspect of the present disclosure, the rear head restraint body includes an upward facing body portion contacting an upper face of the rear seatback, and wherein at the in-use position a lower surface of the upward facing body portion is positioned above and spaced clearly away from the upper face of the rear seatback.

In another aspect of the present disclosure, a stop member is included, wherein contact between one of the first link or the second link and the stop member temporarily retains the head restraint assembly at the in-use position.

According to several aspects, a method of actuating a rear-center head restraint system of an automobile vehicle includes: mounting a head restraint assembly to a rear seatback of the automobile vehicle moved between a stowed position and an in-use position; rotatably connecting a first link and a second link to the head restraint assembly, and rotatably connecting the first link and the second link to a rear head restraint body of the head restraint assembly; and actuating a release system to rotate the head restraint assembly between the stowed position and the in-use position.

In another aspect of the present disclosure, the method includes moving a forward-facing surface of the head restraint assembly toward a head of an occupant at the in-use position.

In another aspect of the present disclosure, the method includes: positioning an upward facing body portion of the rear head restraint body in contact with an upper face of the rear seatback in the stowed position; and moving a lower surface of the upward facing body portion above and spaced clearly away from the upper face of the rear seatback at the in-use position.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
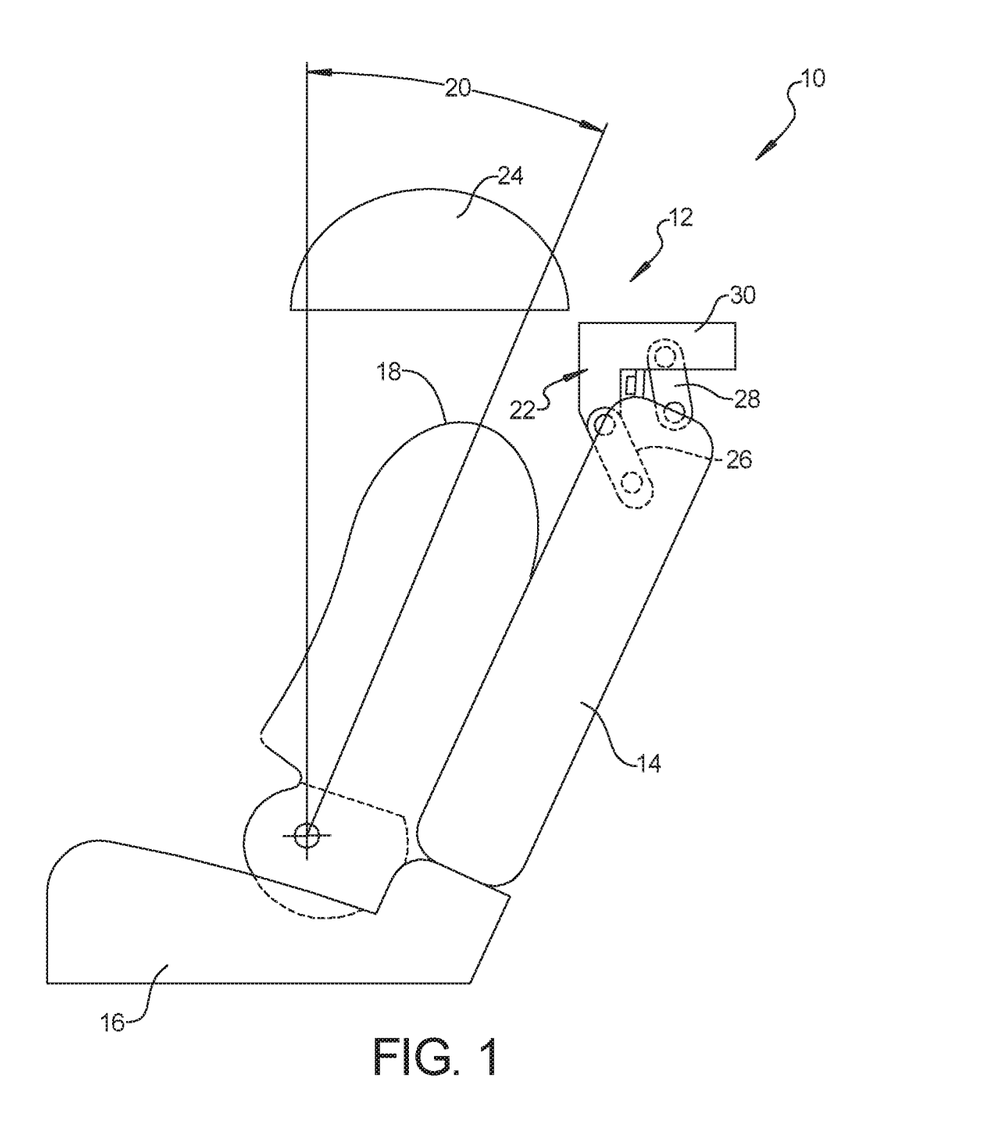
FIG. 1 is a side elevational view of a rear-center head restraint system in a deployed or in-use position according to an exemplary aspect.

Referring to FIG. 1, a rear-center head restraint system 10 for an automobile vehicle includes a head restraint assembly 12 shown in in this view in a deployed or in-use position. The head restraint assembly 12 is rotatably mounted to a rear seatback 14 which is rotatably connected to a rear seat base 16. An occupant 18 seated on the rear seat base 16 is oriented at an angle 20 with respect to a vertical plane. The head restraint assembly 12 is moved upward with a forward-facing surface 22 of the head restraint assembly 12 moved rearward from a stowed position shown and described in reference to FIG. 2 to be angled forward in the in-use position shown such that a head 24, shown for example as a zone of potential head positions of the occupant 18 may contact the forward-facing surface 22 during a collision or accident event. The head restraint assembly 12 also includes a first link 26 and a second link 28 which form part of a 4-link set shown and described in greater detail in reference to FIG. 9, rotatably connected to the seatback 14 and are also rotatably connected to a rear head restraint body 30 of the head restraint assembly 12. According to several aspects, the rear head restraint body 30 is generally L-shaped.

Referring to FIG. 2 and again to FIG. 1, a stowed position of the head restraint assembly 12 is shown. To move the rear head restraint body 30 from the stowed position to the in-use position shown in FIG. 1, a release system 31 is actuated which is described in greater detail below. To return the rear head restraint body 30 from the in-use position shown in FIG. 1 to the stowed position shown in FIG. 2 the rear head restraint body 30 is manually rotated forward about an arc of rotation 32 defining a counterclockwise rotation as viewed in FIG. 2. At the stowed position a forward-facing body portion 34 having the forward-facing surface 22 is forward of and lower than the in-use position and an upward facing body portion 36 is lower than the in-use position and contacts an upper face 38 of the rear seatback 14.

Figure 2:
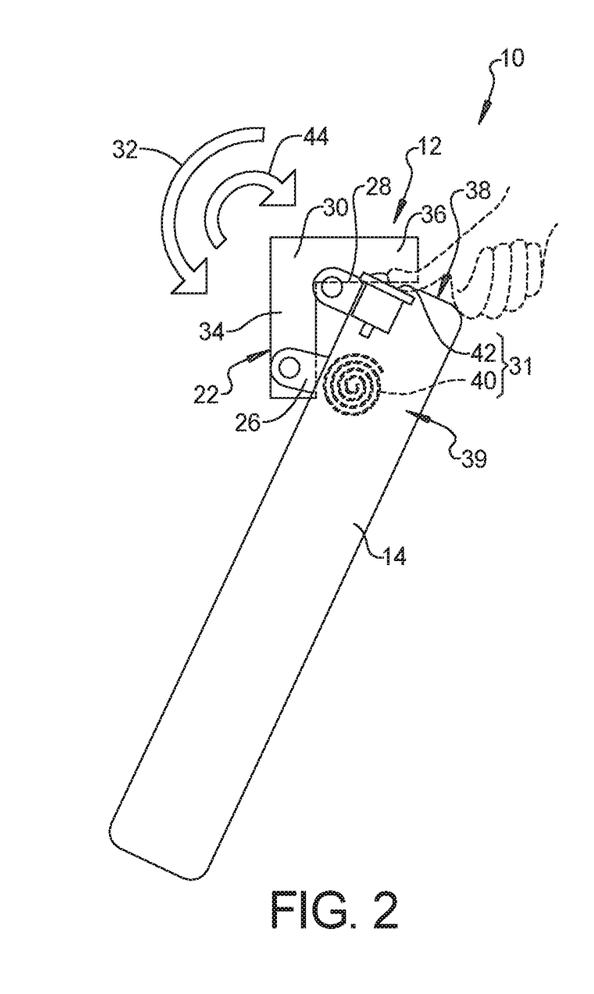
FIG. 2 is a side elevational view of the rear-center head restraint system of FIG. 1 in a stowed position.

According to several aspects the release system 31 includes a biasing member 40 biasing the first link 26 and a release device 42. Rotation of the rear head restraint body 30 about the arc of rotation 32 torsionally compresses the biasing member 40, which according to several aspects defines a coil spring, and latches the release device 42 defining a furthest point of travel along the arc of rotation 32. When the release device 42 is subsequently manually triggered the head restraint assembly 12 is biased by the biasing force of the biasing member 40 to rotate about a second arc of rotation 44 opposite to the arc of rotation 32 and toward the in-use position shown in FIG. 1. Rotation occurs with respect to the first link 26 and the second link 28. The head restraint assembly 12 is therefore deployed from the stowed position to the in-use position by a single action defined by triggering the release device 42 of the release system 31.

Referring to FIG. 3 and again to FIG. 2, the head restraint assembly 12 is retained at the in-use position by a residual biasing force of the biasing member 40 acting in a direction defined by the arc of rotation 44 and by contact between the second link 28 and a stop member 46. At the in-use position a lower surface 48 of the upward facing body portion 36 is positioned above and spaced clearly away from the upper face 38 of the rear seatback 14 raising the rear head restraint body 30 up to an elevation to be contacted by a head of an occupant. As previously noted, to return the head restraint assembly 12 from the in-use position to the stowed position shown in FIG. 2, a force is manually applied such as by a hand 50 of the occupant to rotate the head restraint assembly 12 about the arc of rotation 32 until the release device 42 latches.

Figure 3:
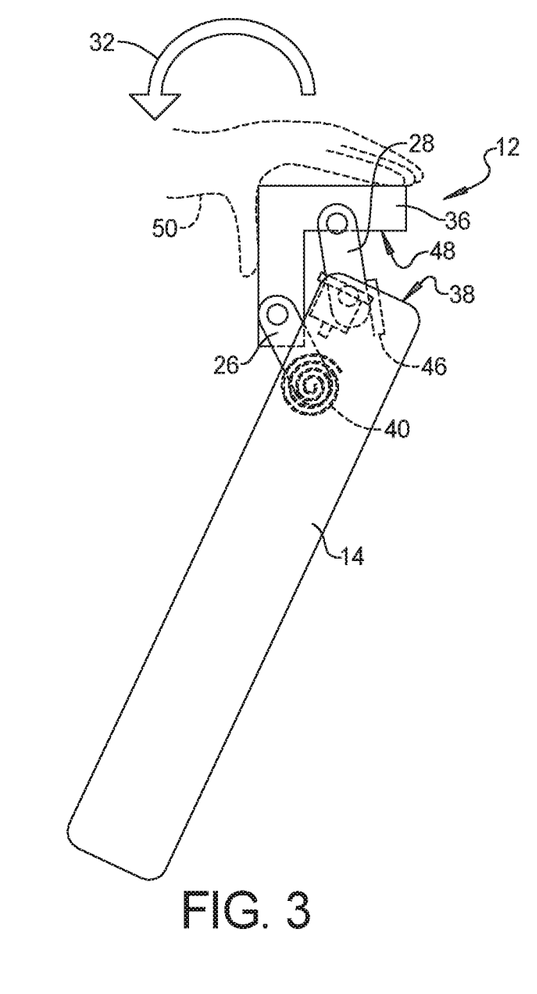
FIG. 3 is a side elevational view of the rear-center head restraint system of FIG. 1 in the in-use position ready for return to the stowed position.
Figure 4:
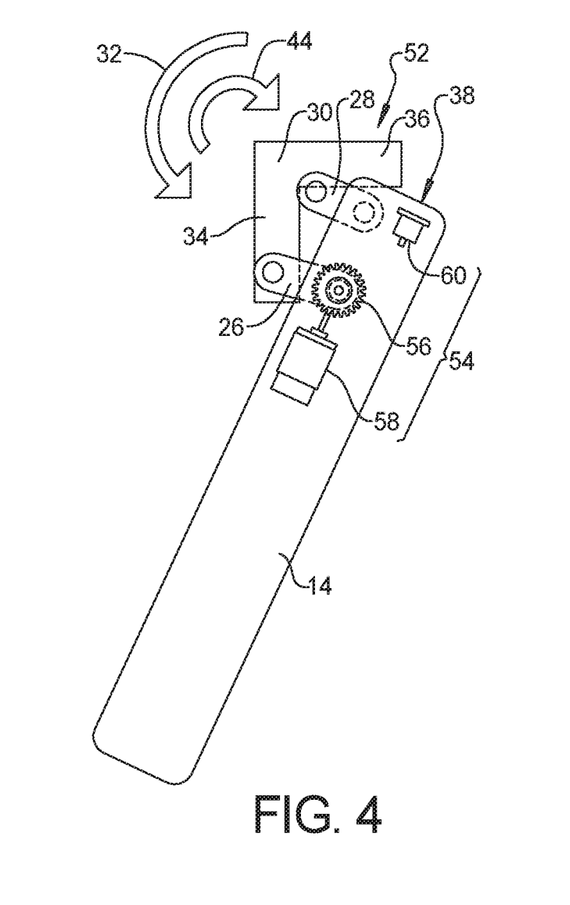
FIG. 4 is a side elevational view of another aspect of a rear-center head restraint system in a stowed position.
Figure 5:
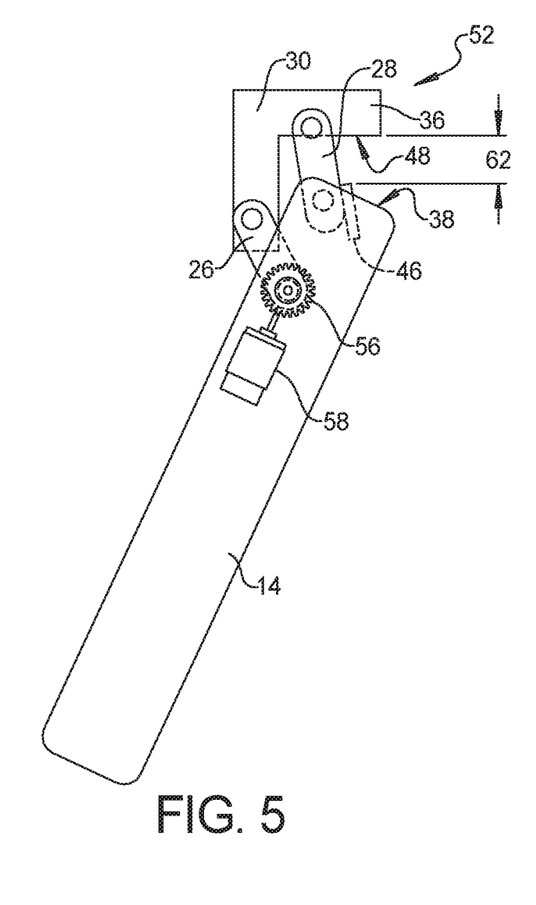
FIG. 5 is a side elevational view of the rear-center head restraint system of FIG. 4 shown after deployment to an in-use position.

Referring to FIG. 4 and again to FIGS. 2 and 3, according to several aspects a head restraint assembly 52 is modified from the head restraint assembly 12, with common parts presented with the same component numbers. In lieu of being displaced from the stowed position to the in-use position using a biasing force, the head restraint assembly 52 is displaced under power. To move the rear head restraint body 30 from the stowed position shown to an in-use position shown and described in reference to FIG. 5, a release system 54 is actuated which is described in greater detail below. According to several aspects the release system 54 includes a gear 56, an electric motor 58 and a release device 60 which according to several aspects defines a switch. To rotate the head restraint assembly 52 the gear 56 is engaged with one of the links, which according to several aspects is the first link 26. The gear 56 is engaged and rotated by operation of the electric motor 58 located within the rear seatback 14. The electric motor 58 may be operated to rotate the gear 56 in opposite rotational directions, thereby providing a powered rotation in the arc of rotation 44 to reach the in-use position, and to return along the arc of rotation 32 to the stowed position shown in FIG. 4. The release device 60 is provided on the rear seatback 14, which according to several aspects defines a two-way or toggle switch to permit opposite rotation of the head restraint assembly 52. The head restraint assembly 52, similar to the head restraint assembly 12, is therefore deployed from the stowed position to the in-use position by a single action defined by triggering the release device 60 of the release system 54.

Referring to FIG. 5 and again to FIGS. 1 through 4, the head restraint assembly 52 is shown after rotation to the in-use position where the second link 28 directly contacts the stop member 46. Contact between the head restraint assembly 52 and the stop member 46 temporarily retains the head restraint assembly 52 at the in-use position and acts as a load bearing feature in a crash event. At the in-use position of the rear head restraint body 30 is moved rearward and is elevated between the lower surface 48 of the upward facing body portion 36 and the upper face 38 of the rear seatback 14 by an elevation dimension 62. The elevation dimension 62 is predetermined by selection of a length of and a spacing between the first link 26 and the second link 28 and can vary between vehicle designs.

Referring to FIG. 6 and again to FIGS. 1 through 5, according to several aspects a head restraint assembly 64 is modified from the head restraint assembly 12 and the head restraint assembly 52. At least one of the links of the head restraint assembly 64 is modified to provide a different path of travel for a rear head restraint body 66. A forward-facing body portion 68 is aligned parallel to and abuts against a forward-facing surface 70 of the rear seatback 14 in a stowed position of the head restraint assembly 64 shown. An upward-facing body portion 72 is oriented perpendicular to the forward-facing body portion 68. A first link 74 is modified to connect to the forward-facing body portion 68 at a connection point below an opposite end of the first link 74 connected to the rear seatback 14, which is opposite to the arrangement of the first link 26. A second link 76 is connected to the upward-facing body portion 72 and to the rear seatback 14 similar to the second link 28. The rear head restraint body 66 rotates from a stowed position shown about an arc of rotation 78 toward an in-use position shown in reference to FIG. 7.

Figure 6:
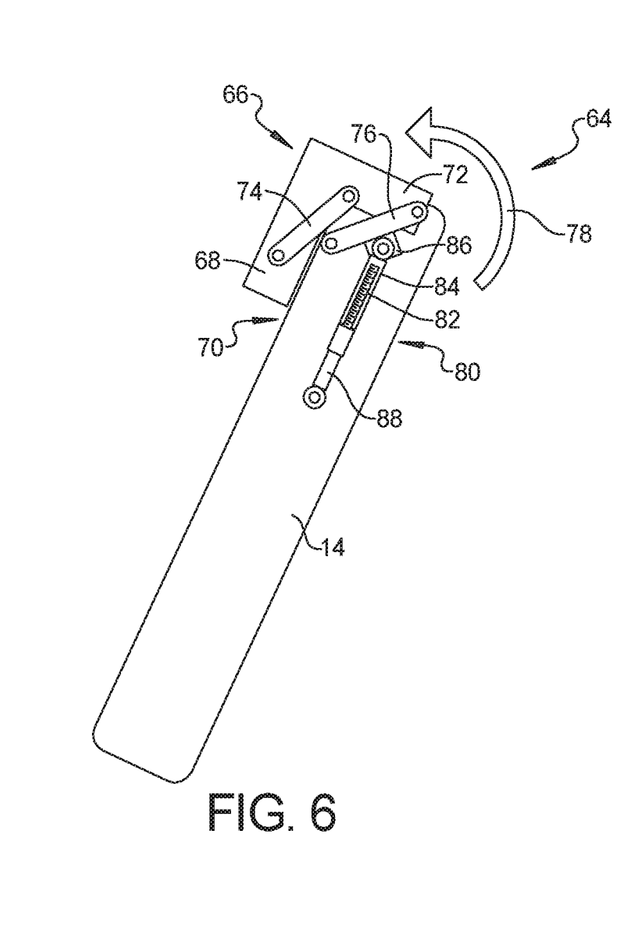
FIG. 6 is a side elevational view of another aspect of a rear-center head restraint system in a stowed position.
Figure 7:
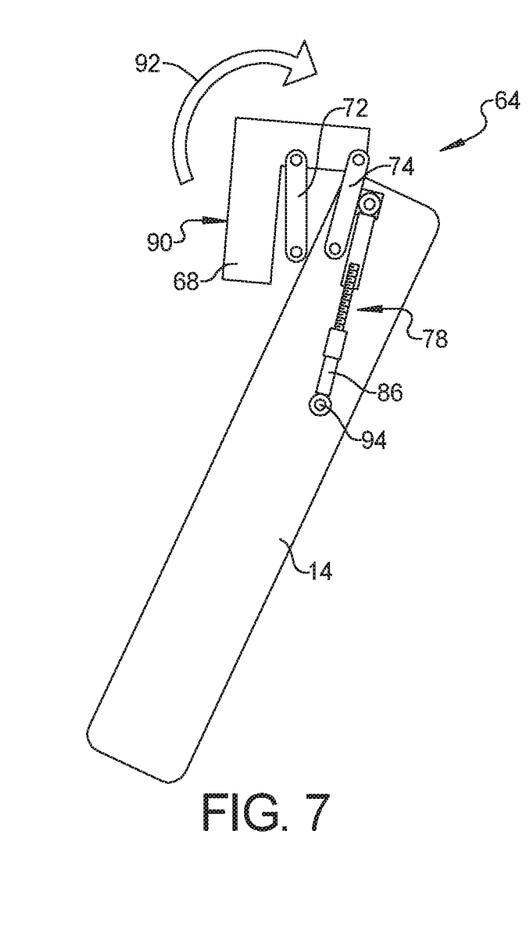
FIG. 7 is a side elevational view of the rear-center head restraint system of FIG. 6 shown after deployment to an in-use position.

Similar to the head restraint assembly 52, the head restraint assembly 64 is also displaced under power. To rotate the head restraint assembly 64 a release system 80 is provided. The release system 80 includes a threaded gear shaft 82 threadably engaged with an internally threaded member 84. The internally threaded member 84 is fixed against axial rotation and is rotatably pinned to a connecting link 86 fixed to the second link 76. The threaded gear shaft 82 is axially rotated using an electric motor 88 located within the rear seatback 14. The electric motor 88 may be operated to rotate the threaded gear shaft 82 in opposite axial rotational directions, thereby extending or retracting the threaded gear shaft 82 which rotates the second link 76 and thereby rotates the rear head restraint body 66.

Referring to FIG. 7 and again to FIGS. 1 through 6, the rear head restraint body 66 rotates away from the stowed position shown in FIG. 6 to the in-use position shown in FIG. 7, which positions a forward-facing surface 90 of the forward-facing body portion 68 proximate to a head of an occupant. The rear head restraint body 66 returns along an arc of rotation 92 to the stowed position shown in FIG. 4 by reversing the operation of the electric motor 88. The release system 80 further includes a release device 94 provided on the rear seatback 14, which according to several aspects defines a two-way switch or a toggle switch to permit opposite rotation of the head restraint assembly 64. A stop member similar to the stop member 46 is not used for the head restraint assembly 64 as frictional engagement of the threaded gear shaft 82 with the threads of the internally threaded member 84 prevents un-powered rotation of the head restraint assembly 64. The head restraint assembly 64, similar to the head restraint assembly 12 and the head restraint assembly 52, is therefore deployed from the stowed position to the in-use position by a single action defined by triggering the release device 94 of the release system 80.

Referring to FIG. 8 and again to FIGS. 1 through 3, the rear-center head restraint system 10 is shown in an exemplary installation of a three-seat configuration 96 having a right seat 98, a left seat 100 and a rear center seat 102. A head restraint 104 of known design is mounted on a rear seatback 106 of the right seat 98. Similarly, a head restraint 108 of known design is mounted on a rear seatback 110 of the left seat 100. The rear head restraint body 30 of the rear-center head restraint system 10 is mounted to the rear center seat 102. According to several aspects a top surface 112 of rear head restraint body 30 in the stowed position shown is aligned flush with or below an upper face 114 of the rear seatback 110 which provides maximum rear visibility for the driver of the automobile vehicle looking rearward in a rear view mirror during driving or when backing up the automobile vehicle.

Figure 8:
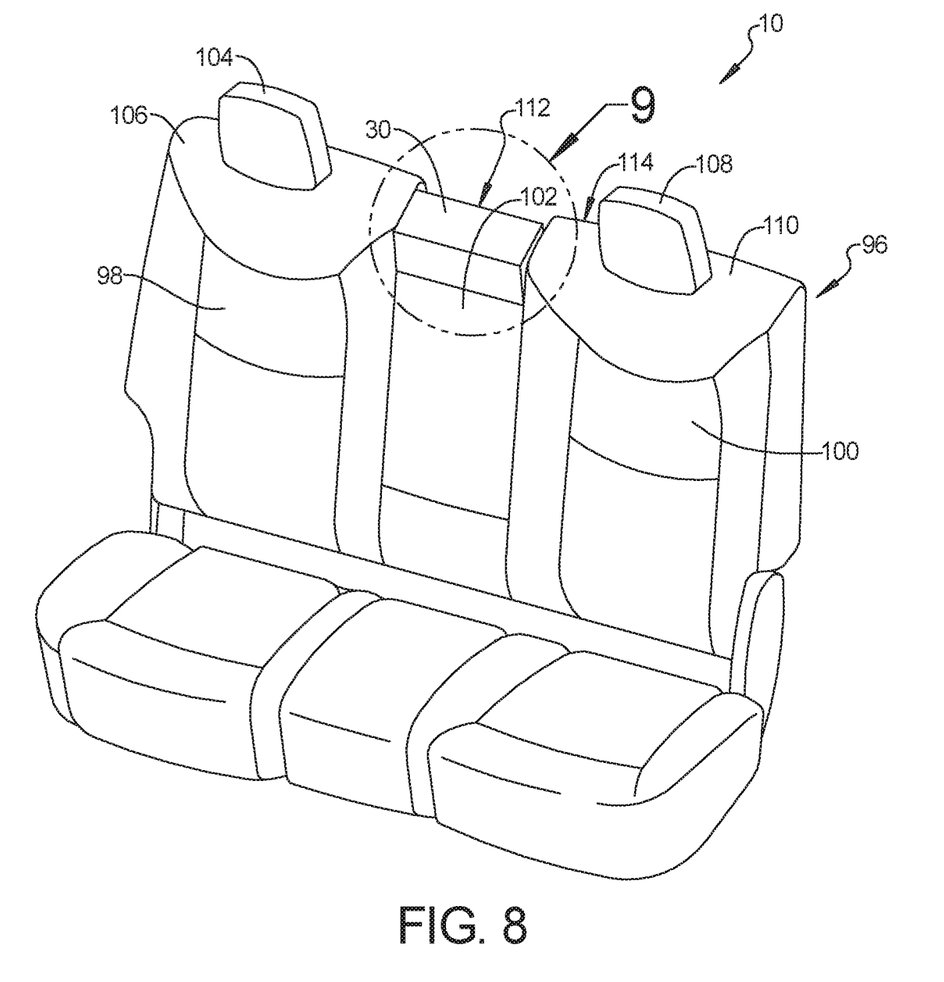
FIG. 8 is a front left perspective view of a vehicle rear seat assembly including the rear-center head restraint system of FIG. 1.

Referring to FIG. 9 and again to FIG. 8, the rear head restraint body 30 is shown in phantom to more easily view the components connecting the rear head restraint body 30 to the rear seatback 110. The first link 26 and the second link 28 are rotatably connected to a mounting structure 116 within the rear center seat 102, which together with a third link 118 and a fourth link 120 on an opposite side of the rear headrest restraint body 30 define a 4-link set. With the rear head restraint body 30 in the stowed position the first link 26, the second link 28, the third link 118 and the fourth link 120 are rotated forward, which compresses the biasing member 40 connected to the first link 26 and a second biasing member 122 connected to the third link 118. The release device 42 is fully extended and is partially positioned above the rear seatback 110. The release device 42 is connected by a release system 124 to of the four links.

Figure 9:
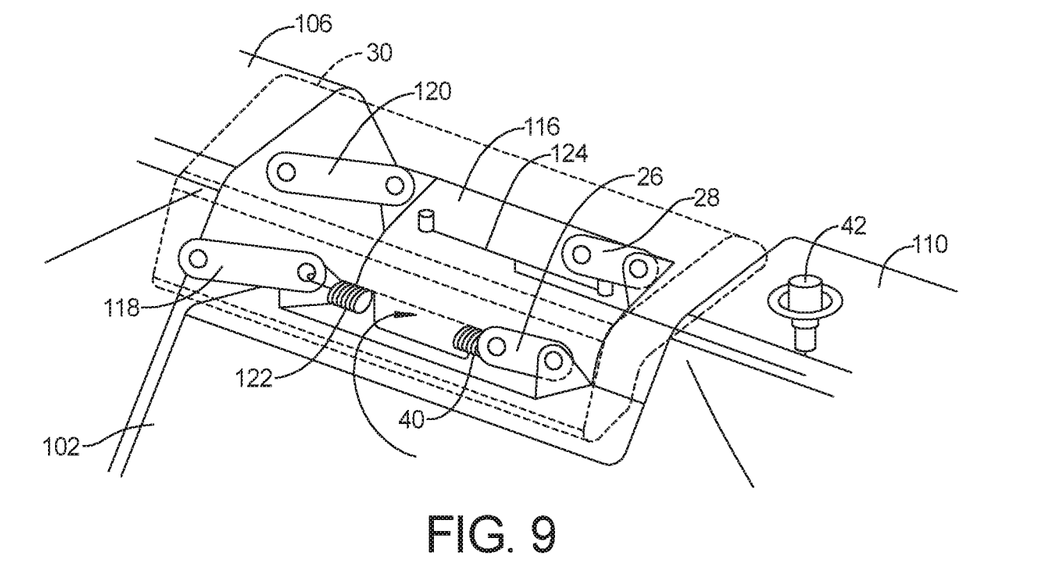
FIG. 9 is a top left perspective view of area 9 of FIG. 8.
Figure 10:
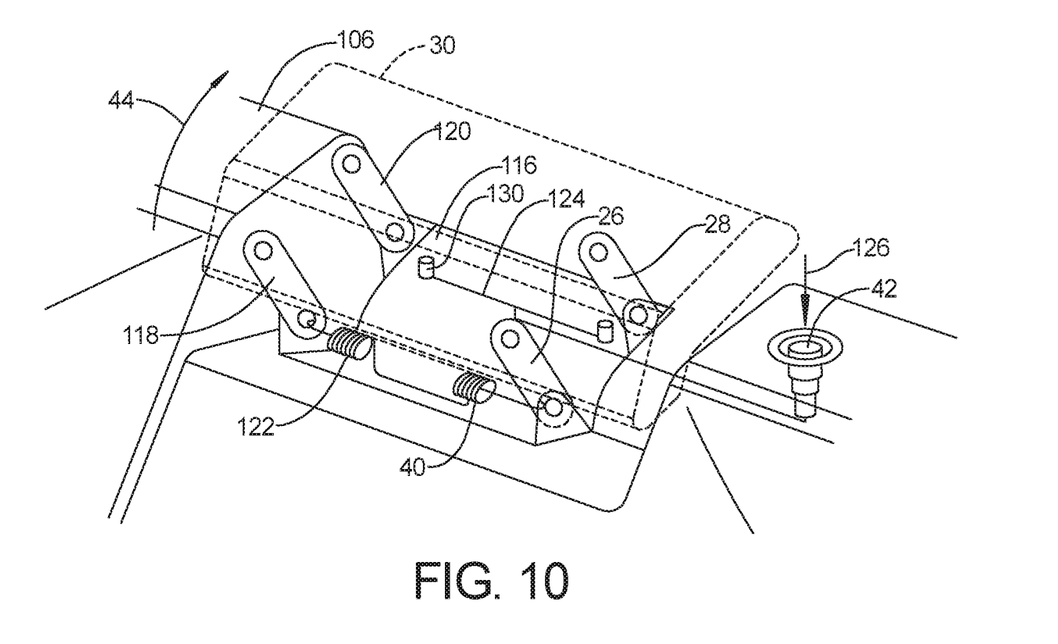
FIG. 10 is a top left perspective view modified from FIG. 9 showing deployment to an in-use position.
Figure 11:
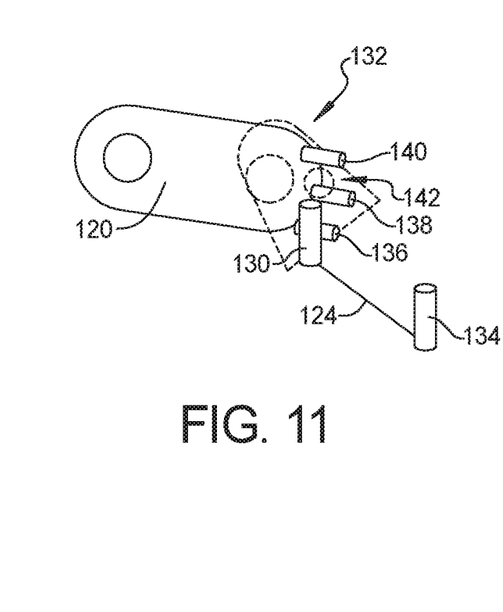
FIG. 11 is a left perspective view of a latching system of the present disclosure showing a stowed latched position of the rear head restraint body.

Referring to FIG. 10 and again to FIGS. 9 through 11, to release the rear head restraint body 30 for motion away from the stowed position shown in FIG. 9 to the deployed or in-use position shown in FIG. 10, the release device 42 is manually depressed in a downward direction 126 which actuates the release system 124 and allows the biasing force of the biasing member 40 and the second biasing member 122 to rotate the rear head restraint body 30 about the second arc of rotation 44. At least one load bearing feature 130 is provided with the release system 124 to act as a positive stop for the rear head restraint body 30 at the in-use position. A rearward acting force applied by the head of an occupant against the rear head restraint body 30 is reacted on the load bearing feature 130. The rear head restraint body 30 can be manually lowered back to the stowed position shown in FIGS. 8 and 9 when a passenger is no longer occupying the rear center seat 102.

Referring to FIG. 11 and again to FIGS. 9 and 10, a releasable latch system 132 may also be provided for latching the rear head restraint body 30 in both the stowed position and the in-use position. The releasable latch system 132 includes the load bearing feature 130 as described above, together with a second load bearing feature 134 also fixed to the release system 124. The second load bearing feature 134 performs the same function as the load bearing feature 130. The fourth link 120 as well as the second link 28 not shown in FIG. 11 each include a first latch pin 136, a second latch pin 138 and a third latch pin 140, each equidistantly separated from a successive one of the latch pins. A clearance space or gap 142 is provided between successive ones of the latch pins, having a gap width greater than a diameter or width of the load bearing feature 130 and the second load bearing feature 134. In the stowed position of the rear head restraint body 30 the load bearing feature 130 is in direct contact with the first latch pin 136, preventing rotation of the fourth link 120 as well as the rear head restraint body 30.

With reference to FIG. 12 and again to FIGS. 9 through 11, when the occupant pushes the release device 42, the 124 together with the load bearing feature 130 and the second load bearing feature 134 are displaced in the downward direction 126 such that the load bearing feature 130 disengages from contact with the first latch pin 136, allowing rotation of the fourth link 120 about the second arc of rotation 44 away from the stowed position and toward the in-use position shown in phantom using the torsion spring force of the biasing member 40, and the release device 42 will deploy.

Figure 12:
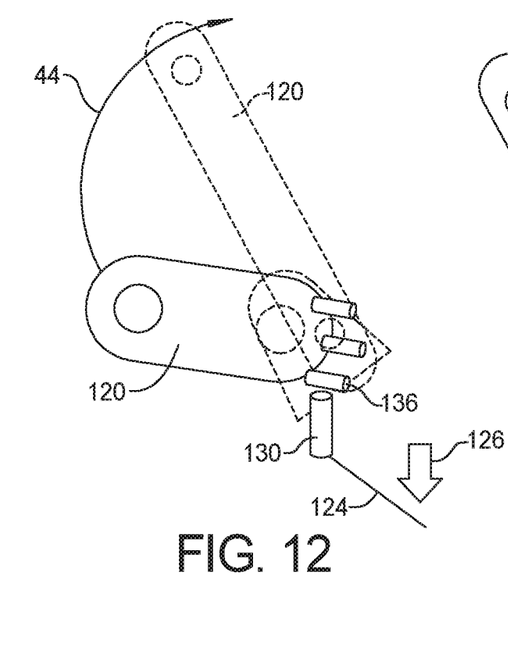
FIG. 12 is a left perspective view modified from FIG. 11 to show a released position of the rear head restraint body.
Figure 13:
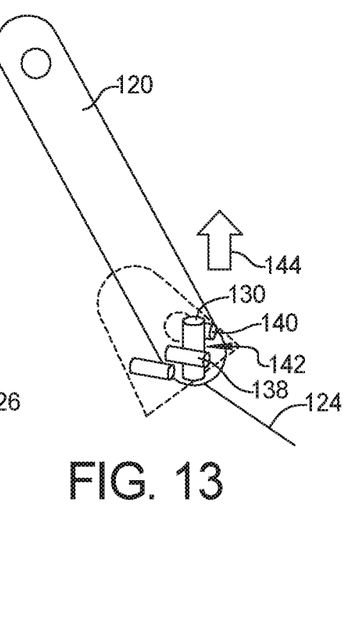
FIG. 13 is a left perspective view modified from FIG. 11 to show an in-use latched position of the rear head restraint body.

Referring to FIG. 13 and again to FIGS. 10 through 12, when the occupant releases the release device 42 the load bearing feature 130 extends in an upward direction 144 and engages within the gap 142 provided between the second latch pin 138 and the third latch pin 140 to lock the rear head restraint body 30 in the in-use position. The load bearing feature 130 functions as a load bearing device in both the stowed and in-use positions of the rear head restraint body 30.

A rear-center head restraint system of the present disclosure offers several advantages. These include the head restraint assemblies of the present disclosure can achieve motion from a stowed condition to an in-use condition with one actuation in any occupant arrangement including steep torso angle, an occupant sitting forward of an intended point, and the like. The rear-center head restraint system improves rear vision for the operator of the automobile vehicle by providing a lowered position of the rear-center head restraint body and allows customized backseat orientations and different heights. The lowered position also improves rear seatback fold-down operation. The links may be adjusted to meet different vehicle design requirements. Head restraint deployment is achieved by a single operation such as depressing or actuating a push-button or switch.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A rear-center head restraint system of an automobile vehicle, comprising:
   a rear seatback of the automobile vehicle;
   a head restraint assembly rotatably mounted to the rear seatback and moved between a stowed position and an in-use position, the head restraint assembly including:
      a rear head restraint body; and
      at least one link rotatably connecting the rear head restraint body to the rear seatback;
   a release system acting to rotate the head restraint assembly between the stowed position and the in-use position, wherein the release system includes a biasing member biasing the at least one link, wherein rotation of the rear head restraint body in a first arc of rotation compresses the biasing member, wherein the release system includes a release device and compression of the biasing member latches the release device at a furthest point of travel in the first arc of rotation, and wherein when the release device is manually triggered the head restraint assembly is biased by a biasing force of the biasing member to rotate about a second arc of rotation opposite to the first arc of rotation and toward the in-use position; and
   a stop member, wherein contact between the at least one link and the stop member temporarily retains the head restraint assembly at the in-use position.

2. A rear-center head restraint system of an automobile vehicle, comprising:
   a rear seatback of the automobile vehicle;
   a head restraint assembly rotatably mounted to the rear seatback and moved between a stowed position and an in-use position, the head restraint assembly including:
      a rear head restraint body defining an L-shape and including a forward-facing surface moved toward a head of an occupant at the in-use position; and
      a first link rotatably connected to the rear seatback and a second link rotatably connected to the rear seatback, the first link and the second link also rotatably connected to the rear head restraint body; and
   a release system acting to rotate the head restraint assembly selectively between the stowed position and the in-use position, wherein the release system includes a biasing member biasing the first link, wherein rotation of the rear head restraint body in a first arc of rotation compresses the biasing member, wherein the release system includes a release device and compression of the biasing member latches the release device at a furthest point of travel in the first arc of rotation, and wherein when the release device is manually triggered the head restraint assembly is biased by a biasing force of the biasing member to rotate about a second arc of rotation opposite to the first arc of rotation and toward the in-use position; and
   a stop member, wherein contact between the first link and the stop member temporarily retains the head restraint assembly at the in-use position.

3. The rear-center head restraint system of the automobile vehicle of claim 2, wherein the biasing member defines a coil spring connected to the first link.

4. The rear-center head restraint system of the automobile vehicle of claim 2, wherein the rear head restraint body includes an upward facing body portion contacting an upper face of the rear seatback, and wherein at the in-use position a lower surface of the upward facing body portion is positioned above and spaced clearly away from the upper face of the rear seatback.

5. A method of actuating a rear-center head restraint system of an automobile vehicle, comprising:
   providing a rear-center head restraint system, comprising:
      a rear seatback of the automobile vehicle;
      a head restraint assembly rotatably mounted to the rear seatback and moved between a stowed position and an in-use position, the head restraint assembly including:
         a rear head restraint body; and
         at least one link rotatably connecting the rear head restraint body to the rear seatback;
      a release system acting to rotate the head restraint assembly between the stowed position and the in-use position, wherein the release system includes a biasing member biasing the at least one link, wherein rotation of the rear head restraint body in a first arc of rotation compresses the biasing member, wherein the release system includes a release device and compression of the biasing member latches the release device at a furthest point of travel in the first arc of rotation, and wherein when the release device is manually triggered the head restraint assembly is biased by a biasing force of the biasing member to rotate about a second arc of rotation opposite to the first arc of rotation and toward the in-use position; and
      a stop member, wherein contact between the at least one link and the stop member temporarily retains the head restraint assembly at the in-use position;
   mounting the head restraint assembly to the rear seatback of the automobile vehicle moved between the stowed position and the in-use position;
   rotatably connecting the first link and a second link to the head restraint assembly, and rotatably connecting the first link and the second link to the rear head restraint body of the head restraint assembly; and
   actuating the release system to rotate the head restraint assembly between the stowed position and the in-use position.

6. The method of actuating the rear-center head restraint system of the automobile vehicle of claim 5, further including moving a forward-facing surface of the head restraint assembly toward a head of an occupant at the in-use position.

7. The method of actuating the rear-center head restraint system of the automobile vehicle of claim 5, further including:
   positioning an upward facing body portion of the rear head restraint body in contact with an upper face of the rear seatback in the stowed position; and
   moving a lower surface of the upward facing body portion above and spaced clearly away from the upper face of the rear seatback at the in-use position.

* * * * *